(12) United States Patent
Hayes

(10) Patent No.: US 11,142,382 B1
(45) Date of Patent: Oct. 12, 2021

(54) HARVESTED BALE WRAPPING MATERIAL AND SEALING ACCESSORY TO DELIVER AND PROTECT A CLOSING ADHESIVE

(71) Applicant: L.P. Brown Company, Inc., Memphis, TN (US)

(72) Inventor: James L. Hayes, Senatobia, MS (US)

(73) Assignee: L.P. BROWN COMPANY, INC., Memphis, TN (US)

( * ) Notice: Subject to any disclaimer, the term of this patent is extended or adjusted under 35 U.S.C. 154(b) by 15 days.

(21) Appl. No.: 16/849,431

(22) Filed: Apr. 15, 2020

Related U.S. Application Data

(60) Provisional application No. 62/836,157, filed on Apr. 19, 2019.

(51) Int. Cl.
| | |
|---|---|
| *B65D 65/14* | (2006.01) |
| *C09J 7/20* | (2018.01) |
| *C09J 7/40* | (2018.01) |
| *C09J 7/30* | (2018.01) |
| *A01F 15/07* | (2006.01) |

(52) U.S. Cl.
CPC ............. *B65D 65/14* (2013.01); *C09J 7/20* (2018.01); *C09J 7/30* (2018.01); *C09J 7/403* (2018.01); *A01F 15/071* (2013.01); *A01F 2015/0745* (2013.01); *Y10T 428/1476* (2015.01)

(58) Field of Classification Search
CPC ..... B65D 65/14; C09J 7/20; C09J 7/30; C09J 7/403; Y10T 428/1476; A01F 2015/0745; A01F 15/071
See application file for complete search history.

(56) References Cited

U.S. PATENT DOCUMENTS

| | | |
|---|---|---|
| 1,231,382 A | 6/1917 | Knee |
| 2,726,222 A | 12/1955 | Paimquist et al. |
| 2,999,042 A | 9/1961 | Meister |

(Continued)

FOREIGN PATENT DOCUMENTS

| | | |
|---|---|---|
| AU | 2005300259 B2 | 5/2006 |
| AU | 2008355557 B2 | 11/2009 |

(Continued)

OTHER PUBLICATIONS

The United States Patent and Trademark Office: The International Search Report and Witten Opinion of the International Searching Authority, or the Declaration; International Search Report and Written Opinion for PCT/US2015/022330, dated Jun. 18, 2015; pp. 1-12; The United States Patent and Trademark Office; U.S.

(Continued)

*Primary Examiner* — Patricia L. Nordmeyer
(74) *Attorney, Agent, or Firm* — Wyatt, Tarrant & Combs, LLP; Stephen C. Hall

(57) ABSTRACT

In a continuous roll of wrapping material for crops such as cotton or hay, or other objects, the individual wrapping segments are arranged so that a closing adhesive is part of a sealing accessory and otherwise protected by other structures of the sealing accessory until the point when this closing adhesive is to be exposed for securing a wrapping segment to itself, for example when encircling a subject bale harvested from a field, wherein adjacent wrapping segments separate from each other either at a point of weakness associated with perforations and the like.

14 Claims, 13 Drawing Sheets

(56) References Cited

U.S. PATENT DOCUMENTS

| | | |
|---|---|---|
| 3,053,722 A | 9/1962 | Petty |
| 3,072,512 A | 1/1963 | Dalle |
| 3,150,029 A | 9/1964 | Ferrand |
| 3,162,393 A | 12/1964 | Gelleke |
| 3,349,765 A | 10/1967 | Blanford |
| 3,369,766 A | 2/1968 | Herman |
| 3,457,919 A | 7/1969 | Harbard |
| 3,735,865 A | 5/1973 | Smith |
| 3,746,607 A | 7/1973 | Harmon et al. |
| 3,942,713 A | 3/1976 | Olson et al. |
| 4,041,201 A | 8/1977 | Wuker |
| 4,050,121 A | 9/1977 | Richman |
| 4,127,132 A | 11/1978 | Karami |
| 4,201,352 A | 5/1980 | Madachy |
| 4,258,846 A | 3/1981 | Campo |
| 4,338,084 A | 7/1982 | Berthelsen |
| 4,343,132 A | 8/1982 | Lawless, Jr. |
| 4,349,163 A | 9/1982 | Wise |
| 4,416,392 A | 11/1983 | Smith |
| 4,605,577 A | 8/1986 | Bowytz |
| 4,688,368 A | 8/1987 | Honegger |
| 4,768,810 A | 9/1988 | Mertens |
| 4,778,701 A | 10/1988 | Pape et al. |
| 4,801,480 A | 1/1989 | Panza et al. |
| 4,917,928 A | 4/1990 | Heinecke |
| 4,941,882 A | 7/1990 | Ward et al. |
| 5,057,097 A | 10/1991 | Gesp |
| 5,080,254 A | 1/1992 | Feer |
| 5,221,393 A | 6/1993 | Heutschi |
| 5,234,517 A | 8/1993 | Pape et al. |
| 5,324,078 A | 6/1994 | Bane |
| 5,365,836 A | 11/1994 | Campbell |
| 5,413,656 A | 5/1995 | Kuhnhold et al. |
| 5,472,089 A | 12/1995 | Specogna et al. |
| 5,496,605 A | 3/1996 | Augst et al. |
| 5,497,903 A | 3/1996 | Yoneyama |
| 5,520,308 A | 5/1996 | Berg, Jr. et al. |
| 5,591,521 A | 1/1997 | Arakawa et al. |
| 5,646,090 A | 7/1997 | Tamura et al. |
| 5,660,349 A | 8/1997 | Miller et al. |
| 5,885,679 A | 3/1999 | Yasue et al. |
| 5,979,141 A | 11/1999 | Phillips |
| 6,008,429 A | 12/1999 | Ritger |
| 6,153,278 A | 11/2000 | Timmerman et al. |
| 6,295,758 B1 | 10/2001 | Weder et al. |
| 6,453,805 B1 | 9/2002 | Viaud et al. |
| 6,467,719 B1 | 10/2002 | Rodriguez |
| 6,514,585 B1 | 2/2003 | Pearson et al. |
| 6,550,633 B2 | 4/2003 | Huang et al. |
| 6,550,634 B1 | 4/2003 | Alegre DeMiquel et al. |
| 6,632,311 B1 | 10/2003 | Glenna et al. |
| 6,644,498 B1 | 11/2003 | Lemberger et al. |
| 6,663,932 B2 | 12/2003 | McLaughlin et al. |
| 6,685,050 B2 | 2/2004 | Schmidt et al. |
| 6,756,096 B2 | 6/2004 | Harding |
| 6,787,209 B2 | 9/2004 | Mass et al. |
| 6,901,723 B2 | 6/2005 | Jordan et al. |
| 6,971,542 B2 | 12/2005 | Vogel et al. |
| 7,165,928 B2 | 1/2007 | Haverdink et al. |
| 7,541,080 B2 | 6/2009 | Mass et al. |
| 7,625,332 B2 | 12/2009 | Mass et al. |
| 7,636,987 B2 | 12/2009 | Derscheld et al. |
| 7,694,491 B2 | 4/2010 | Noonan et al. |
| 8,071,196 B2 | 12/2011 | Goering |
| 9,949,439 B2 * | 4/2018 | Harchol .......... A01F 15/0715 |
| 10,257,986 B1 * | 4/2019 | Porter .............. A01F 15/071 |
| 10,377,545 B2 * | 8/2019 | Porter .............. B65D 65/22 |
| 10,752,812 B2 * | 8/2020 | Zhang ............. B32B 27/08 |
| 2002/0172792 A1 | 11/2002 | Jarvis et al. |
| 2002/0182367 A1 | 12/2002 | Salzsauler et al. |
| 2003/0000934 A1 | 1/2003 | Tanaka et al. |
| 2003/0059566 A1 | 3/2003 | Chien |
| 2004/0121108 A1 | 6/2004 | Mass et al. |
| 2005/0034429 A1 | 2/2005 | Mass et al. |
| 2005/0155714 A1 | 7/2005 | Adams |
| 2007/0152010 A1 | 7/2007 | Denen et al. |
| 2007/0240389 A1 | 10/2007 | Frerichs |
| 2008/0003403 A1 | 1/2008 | Garegnani |
| 2008/0245923 A1 | 10/2008 | Maddaleni et al. |
| 2008/0280098 A1 | 11/2008 | Papadopoulos et al. |
| 2009/0274881 A1 | 11/2009 | Mass |
| 2009/0302147 A1 | 12/2009 | Emoto |
| 2010/0237179 A1 | 9/2010 | De Matteis |
| 2011/0133015 A1 | 6/2011 | Gelli et al. |
| 2011/0309544 A1 | 12/2011 | Hupp et al. |
| 2011/0311749 A1 | 12/2011 | McNeil et al. |
| 2012/0148783 A1 | 6/2012 | Kunkleman |
| 2013/0143001 A1 | 6/2013 | Manifold et al. |
| 2013/0221078 A1 | 8/2013 | Skelton |
| 2013/0248643 A1 | 9/2013 | Newhouse et al. |
| 2013/0320124 A1 | 12/2013 | Rochon et al. |
| 2014/0263590 A1 | 9/2014 | Skelton |
| 2014/0352263 A1 | 12/2014 | Harchol et al. |
| 2014/0370224 A1 | 12/2014 | Kien et al. |
| 2015/0030812 A1 | 1/2015 | Teal |
| 2015/0274483 A1 | 10/2015 | Newhouse et al. |
| 2016/0151994 A1 | 6/2016 | Castillo et al. |
| 2016/0177135 A1 | 6/2016 | Allen |

FOREIGN PATENT DOCUMENTS

| | | |
|---|---|---|
| EP | 1584574 A2 | 10/2005 |
| GB | 2233962 A2 | 1/1991 |
| WO | 9813636 A2 | 4/1998 |
| WO | 0061359 A2 | 10/2000 |
| WO | 0061359 A3 | 10/2000 |
| WO | 2015010151 A1 | 1/2015 |
| WO | 2015024052 A1 | 2/2015 |

OTHER PUBLICATIONS

The United States Patent and Trademark Office; The International Search Report and the Witten Opinion of the International Searching Authority, or the Declaration; PCT/US17/53748 Search Report, dated Feb. 9, 2018; pp. 1-16; United States Patent Office; U.S.

* cited by examiner

HARVESTED BALE WRAPPING MATERIAL AND SEALING ACCESSORY TO DELIVER AND PROTECT A CLOSING ADHESIVE

CROSS-REFERENCE TO RELATED APPLICATION

This nonprovisional utility application claims priority to and benefit from U.S. Provisional Application No. 62/836,157, titled "Harvested bale wrapping material sheets," filed on Apr. 19, 2019, which is hereby incorporated by reference in its entirety.

FIELD OF INVENTION

The current disclosure involves the arrangement and efficient deployment from a self-propelled harvesting machine of self-adhering sheet material in individual segments, wherein the individual wrapping segments hold a bale together and isolate it from the weather, rain, and elements in the field until the bales may be collected for further processing.

BACKGROUND

Present embodiments are directed to sheets of wrapping material arranged in wrapping material segments. Many objects, including agricultural crops, as well as other solid objects which illustratively may include fabrics, paper products, plastic products, are typically provided in some manner that requires, at some point in time, wrapping of collected or harvested articles in bulk. Such wrapping materials, non-limiting examples of which include plastic film, polymer film, a netting, a mesh, or any like segmented web of material, is applied in such a fashion to facilitate collection, storage, transport, and/or protection from elements for such objects.

As one example, agricultural crops are typically harvested and collected into modules to facilitate transport and ultimate introduction within a processing machine (for instance, cotton is formed into a module in the field for transport to a gin where it will be processed for future use). To do so, wrapping articles have been provided to accommodate such necessary activities, particularly to protect the harvested cotton from the elements until it can be transported from the field, ensure such crops are kept together during transport, and allow a basis for measuring the amount actually harvested and transported.

In the past, continuous harvesting and wrapping of crops occurred in two steps, at times separated in time by many days where the crops, harvested into modules or the like, were exposed to elements. More recently, developments have been undertaken to make the process more efficient to accomplish the harvest and wrapping in substantially contemporaneously. These newer devices offer simultaneous harvest and wrapping with some improvement in efficiency. Typically, bale wrapping materials for cotton and other harvested crops are installed as a roll upon a self-propelled harvesting machine, such as, for example, a John Deere® CP690 Cotton Picker (Deere & Company, Moline, Ill.). When transported to a processing location (again, for example, a cotton gin), the wrapping materials on each module are then removed so the collected crops can be further processed.

In a typical process of wrapping cotton modules during harvesting, a single wrapping segment securely encircles the bale to ensure protection against the elements in the field. Secondly, wrapping segments coming off as the roll unwinds are arranged to separate an active (first) wrapping segment from a second wrapping segment adjacent to the first wrapping segment. Generally, an objective is to allow for effective wrapping and release of such materials that will cover substantially the circumference of a cylindrical module or other object with a wrapping segment (sometimes referred to in some quarters as a wrapping sheet). To meet the objective, a harvesting machine controls the speed of the roll as it unwinds to cover a newly formed module of crop, using a system that includes clutch, a brake, or both. This also permits further wrapping of subsequent modules with additional wrapping segments off of the same roll. Accordingly, segment by segment, such a system helps to separate one wrapping segment, generally referred to as the leading wrapping segment at a given point in time, from its roll. This action permits feed of a single wrapping segment that wraps around the formed cotton module and adheres to itself as described further herein, with the trailing end of a first wrapping segment automatically separating from the following leading edge of a second wrapping segment.

Prior wrapping materials include rolls of individual wrapping segments successively joined via elaborate folds where the substrate used in forming the wrap itself for one wrapping segment folds over upon an adjacent wrapping segment. Other designs have included multiple interacting adhesive layers stacked on top of trailing and forward ends of each wrapping segment, with the trailing end adhesive of each segment equipped with an adhesive surface to seal the end of the wrap on the bale to the wrapping surface immediately beneath it. Such arrangements, however, are prone to the wrapping material becoming tangled with the dispensing machinery or other parts of a self-propelled harvesting machine.

The possibilities of the wrapping material getting tangled, or stuck in machinery, present other potential problems having to do with separating two adjacent wrapping segments that are on a roll. Even when a wrapping material is weakened along a parting line, which facilitates the separation during a wrapping cycle, the separation still generates significant force on the material. That is, a pulling force applied upon a first wrapping segment, which is opposed by a force on an adjacent second segment, causes these two wrapping segments to separate. Often, this force is very substantial, and it frequently creates undesirable distortions or uneven tension of the wrap as it is placed over some portion of a subject bale. This leaves the harvested item susceptible to uneven shaping or even uncovered portions and partially exposed to the elements. Or it might result in foldback of the wrapping material upon itself, resulting in possible interruption of service until the wrapping machinery on the self-propelled harvesting machine is detangled or otherwise disengaged from the wrapping material. Thus, there is a need for wrapping material that is more easily and efficiently separated, to reduce problems associated with the separation force.

The current embodiments provide solutions to the problems noted above, and confer additional benefits in their use as discussed below.

SUMMARY OF EMBODIMENTS

Generally, the embodiments herein encompass a roll of continuous wrapping material in an elongated, continuous sheet formed into separable wrapping segments. In some embodiments, the wrapping segments are provided around a cylindrical core including a plurality of successive wrapping segments with a first wrapping segment, a series of middle wrapping segments, and a last wrapping segment attached to said cylindrical core. As desired, wrapping materials may be utilized for use in wrapping of solid objects, including but not limited to agricultural products, such as cotton. In some embodiments, the wrapping material according to multiple embodiments and alternatives provided for herein includes a substrate which is from about 40 to about 120 microns thick, and the length of an individual wrapping segment is from about 15 to about 25 meters, but again varying within or even outside of this range depending upon the harvested material.

The wrapping materials may be composed of one or more of a variety of materials including, without limitation, polyolefin films, polyolefin nettings, mesh, and woven or fibrous materials. The width of such a wrapping material, including that which forms the wrapping segments, should be sufficient to cover the width of the subject bale or other item being wrapped.

The wrapping segments can be connected to each successive segment through periodic separable connections, wherein each of said wrapping segments has a leading section, a trailing section, and a body section therebetween, wherein said wrapping segment leading section extends from a leading end to said body section. The core is typically a cardboard or plastic cylinder of a certain diameter to allow unwinding of the wrap material at desired rates and distances.

Also included herein is a roll of wrapping segments as described above, wherein a separation occurs in the substrate that exposes an otherwise protected permanent adhesive. This particular permanent adhesive is referred to herein, and labeled in FIG. 1 as, a closing adhesive. In some embodiments, the closing adhesive does not contact the wrapping segment itself. Rather, the closing adhesive is part of a sealing accessory to the wrapping segments comprising the closing adhesive, a release liner, a seal protector, and a seal carrier as described herein. The seal protector and the seal carrier are joined to the wrapping segments by a permanent adhesive (different from the closing adhesive). The wrapping segments and a plurality of these accessories are joined to form a roll, such that one such sealing accessory spans the perforation between adjacent wrapping segments.

In general, the wrapping segments of the current embodiments are typically synthetic materials such as polyethylene formed as mesh, film, fabric, composites, and the like, wherein the wrapping material is formed of a series of adjacent segments as a web. Because of the easier-to-separate wrapping segments afforded by the present embodiments, the wrapping material is less prone to tearing, tangling, and unwrapping once it has wound around a bale. Further, a reduced incidence of recoil lowers the chances of the wrapping material becoming tangled with any components of a self-propelled harvesting machine.

Likewise, employing too many adhesives is undesirable because the more adhesive used, the greater the number of surfaces on the wrapping material that can stick to machinery. To avoid a negative outcome of introducing a wrapping material that sticks to machinery, and to reduce the number of surfaces and areas of the wrapping material that has the potential of sticking to machinery, in some embodiments a seal carrier as described herein has no more than two adhesives which are attached directly and non-releasably to the seal carrier. Similarly, no more than two adhesives are attached directly and non-releasably to any individual wrapping segment.

Accordingly, present embodiments provide wrapping material comprising individual wrapping segments arranged as a continuous substrate, albeit with individual wrapping segments releasably joined (i.e., able to be released and no longer be in contact) at breaks in the surface of the substrate, which divide the substrate into individual wrapping segments. The breaks may be formed as perforations or other weakening of material at a line of demarcation between the individual wrapping segments.

Accordingly, such wrapping material is divided into a desired number of wrapping segments designated by a separation line or point of demarcation between adjoining wrapping segments. A separable connection between adjacent wrapping segments may be achieved, for example and without limitation, with use of spaced perforations, slits, dotting, or scoring in the substrate of the wrapping material, which weakens the continuous substrate (but without total separation) to a desired degree so that each subsequent section is releasable from the remaining substrate. Accordingly, a perforation or other separable connector between adjacent wrapping segments facilitates the separation of adjacent wrapping segments, for example when there is an application of a pulling force on the first wrapping segment which opposes another force (though not necessarily equal force) on the second wrapping segment. As discussed herein, a speed differential is one manner of providing such a separation force. A speed differential may be introduced through ways known in the art, including without limitation a stop action or brake affecting the movement of one part of the continuous web, or a clutch that changes the velocity of unwinding in one portion of the wrapping material relative to another portion.

At these points of demarcation, the substrate is still held by the integrity of its constitution, though this constitution has been intentionally compromised. Optionally, the formation of such a point of demarcation may be introduced during manufacture. Embodiments include those wherein the proper unwinding of each wrapping segment around the bale, separation from the roll itself, and concluding with the wrapping segment adhering to itself is facilitated by a clutch/brake mechanism such as that described in Applicant's prior application Ser. No. 14/667,574, which is U.S. Published Patent Application 20160280404, titled "WRAPPING MATERIALS FOR SOLID OBJECTS," the full contents of which are incorporated by reference herein for all purposes. Each division at a point of demarcation (such as perforations in the substrate) represents, on a first side of the demarcation, a lead wrapping segment, and on a second side of the demarcation, a trailing wrapping segment. For brevity, in the specification and the figures, when adjacent wrapping segments are discussed or shown the wrapping segment on the side of a perforation or demarcation closer to the machine that performs the wrapping is referred to as a first wrapping segment, while the wrapping segment on the side of a perforation or demarcation closer to the core is referred to as a second wrapping segment.

Likewise, the general region of the first wrapping segment adjacent the perforation is considered a trailing edge of that wrapping segment, and the portion of the second wrapping segment is a leading edge of that wrapping segment. Once separated, each wrapping segment is sufficient enough to wrap the object, such as a crop of harvested material. It will be appreciated that, in a continuous web of wrapping material, the initial wrapping segment placed onto a roll provided with adhesive to attach the wrapping material to a core. In some embodiments, the adhesive is a double-sided adhesive, such as sturdy double-sided tape, or a glue may be used to attach the wrapping material to a core. Alternatively, a roll of wrapping material may include an adhesive that attaches a first surface of the initial wrapping segment to an opposite surface of the same initial wrapping segment, after it is wound about the core.

As described further herein, where the trailing end and the leading end between two wrapping segments are joined, there is positioned a sealing accessory bonded (i.e., adhered) to the wrapping material for securing respective ends of a single wrapping segment as it wraps the item of harvested material, thereby maintaining such item in a protectively wrapped state isolated to a significant degree from the elements of nature.

In this regard, each sealing accessory bridges across the line of demarcation between a first wrapping segment and a second wrapping segment, but the sealing accessory is not itself bonded to the line of demarcation itself nor to the lateral ends of either wrapping segment. Rather, the adhering or bonded portion of the sealing accessory is separated by some distance from the line of demarcation which allows improved functionality at the point of separation in the substrate and at the point of completing the wrap when respective ends of a single wrapping sheet are secured.

These and additional benefits are thus supplied for improved versatility and utility of the subject wrap materials.

BRIEF DESCRIPTION OF THE FIGURES

The drawings, schematics, figures, and descriptions contained herein are to be understood as illustrative of steps, structures, features and aspects of the present embodiments and do not limit the scope of the embodiments. The scope of the application is not limited to the precise arrangements or scales as shown in the figures. The figures show distinctive kinds of hatchings for clarity, to better delineate various parts and layers of the inventive wrapping material.

Figure (or, "FIG.") 1 is a side perspective view of a wrapping material during operation, arranged to wrap objects, according to multiple embodiments and alternatives.

MULTIPLE EMBODIMENTS AND ALTERNATIVES

Figure 13:
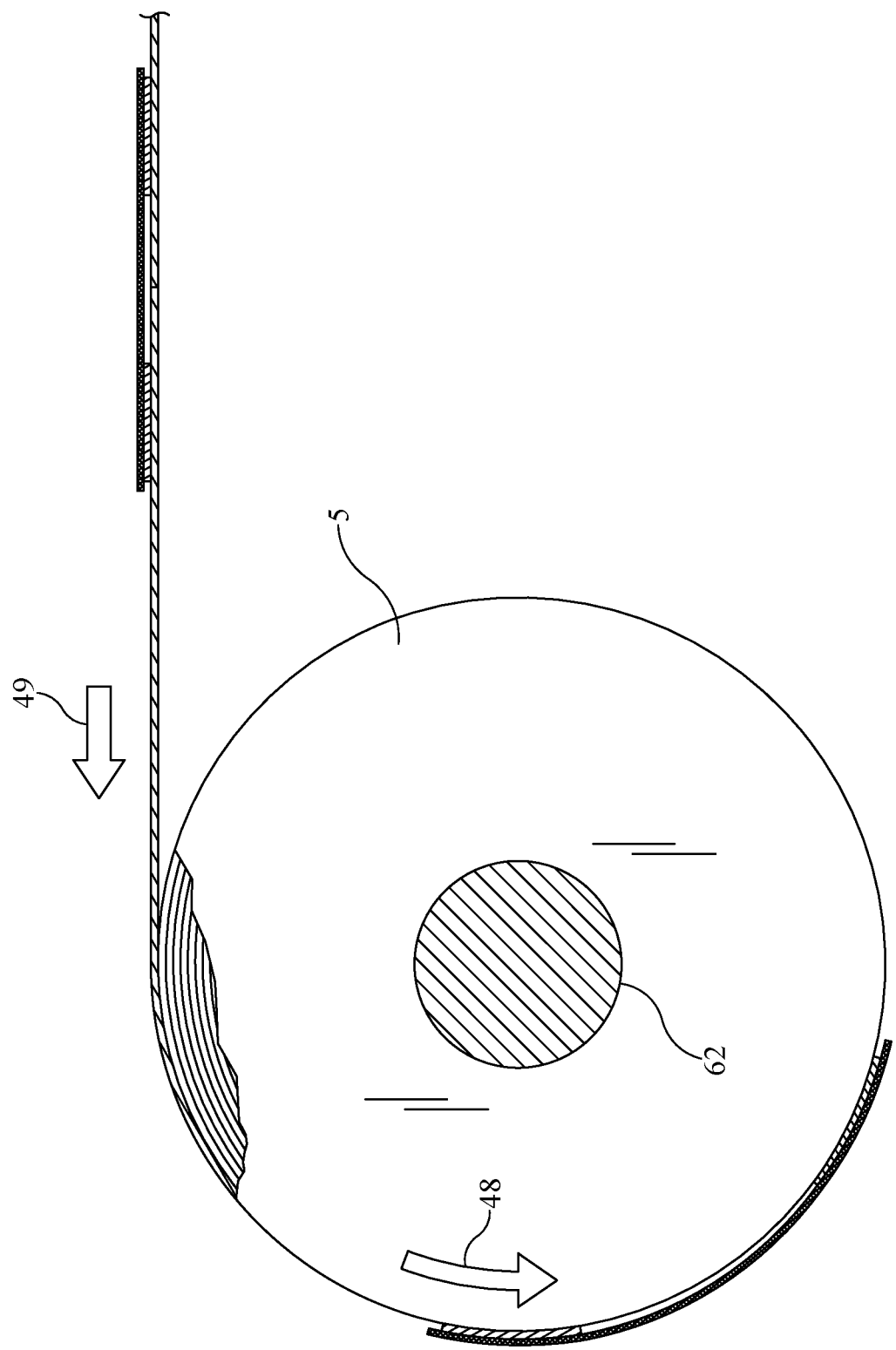
FIG. 13 is a perspective view of a wrapping material being wound onto a core to form a supply roll, according to multiple embodiments and alternatives.

Two general considerations of the present embodiments involved with wrapping objects are a manufacturing phase and an operational phase. Such objects include without limitation modules of harvested material in a field, sometimes referred to interchangeably in this context as bales of harvested material. In some embodiments, the manufacturing phase is associated with winding of wrapping material, as on a core to form a wound roll, and the operational phase is associated with unwinding the contents of the roll as illustrated in FIG. 13.

During a manufacturing phase, one places a plurality of releasably attached, separably connected wrapping segments on a roll, including a sealing accessory described herein, so these wrapping segments will be removed in succession as the roll rotates (unwinds). Accordingly, in operation, what is on the roll, i.e., physically positioned among the wound wrapping segments, will be dispensed one wrapping segment at a time, and each wrapping segment in turn encircles a different bale of harvested material. Encircling may encompass one revolution about the width of the object or as desired multiple revolutions about an object, which may be a module of harvested cotton in a field. The wrapping cycle is completed with proper exposure of adhesive found at a trailing end of a wrapping segment so the segment will adhere to itself once it is wound around a bale, such that the sealing accessory described herein can function to complete the wrap by adhering respective ends of a single wrapping segment around a bale of harvested material, after the single wrapping segment separates from the roll.

In preparation, a roll of wrapping material according to present embodiments and alternatives may be formed by placement of wrapping segments rotationally around a core, which can be cylindrical. One supply roll may contain a plurality of wrapping sheets, with the number of wrapping sheets on an individual supply roll generally being associated with the capacity of the harvesting machine in terms of placement and operation of such a roll. Once the final segment of wrapping material comes off the core, it allows a user to simply remove the empty core and replace it with a full roll of wrap material around a central core for further utilization in the field. The empty core may then be easily discarded upon removal from the harvesting machine. The arrangement of the wrapping material upon a roll, such as around core, can be accomplished in various manners as known in the art, including without limitation those described in U.S. Published Patent Application 20180084729, titled "HARVESTED BALE WRAPPING MATERIAL SHEETS," the full contents of which are incorporated by reference herein for all purposes.

The width of such a wrapping material should be sufficient to cover the width, or end-to-end cylindrical length of a harvested module of cotton, or other item being wrapped. In some embodiments, the wrapping material includes a substrate with a thickness sufficient to withstand the elements of nature if left in an agricultural field for a period of time surrounding a subject bale. Generally, and in non-limiting fashion, the thickness of a suitable agricultural wrapping material substrate is from about 40 to about 120 microns and the length of a wrapping segment is from about 15 to about 25 meters, depending upon the harvested material. It is desirable, though not required, for the length of such a wrapping segment to be sufficient to accommodate a range of modules at least from 50 inches to 94 inches in diameter.

It would be well understood by the ordinarily skilled artisan that such an inventive wrapping material as described herein is scalable to any desired size for different types of wrapped materials. For the wrapping process, a sufficient number of wrapping segments and sealing accessories are contained on a supply reel or core to yield a field supply of the wrapping segments, for harvesting a multiplicity of modules which may be formed cylindrically. The amount of wrapping material on a supply roll is sometimes limited to the capacity of the harvesting machine in terms of the storage space and technological capabilities of said harvesting machine. With that basic background provided, the embodiments may be better understood with the following descriptions, illustrations, and teachings.

The shape of the wrapping segments comprising the inventive wrapping material also varies according to multiple embodiments and alternative. Although any geometric shape may be utilized for such an inventive wrap configuration, optionally each wrapping segment can be rectangular in shape. Alternatively, a leading end of a wrapping segment may exhibit a "chevron" shape with a convex pointed structure, with a trailing end of a wrapping segment exhibiting a concave pointed inverse structure, which is complementary to the leading end chevron of an adjacent wrapping segment.

Generally, a wrapping material according to present embodiments comprises at least two wrapping segments. One is denoted as a first wrapping segment, and the other as a second wrapping segment. The two wrapping segments are releasably joined to each other. In some embodiments, the wrapping material comprises a sealing accessory that comprises a seal carrier, a portion of which is permanently bonded (i.e., non-releasing) to the first wrapping segment. The sealing accessory may also comprise a seal protector, a portion of which adheres to the second wrapping segment, and a closing adhesive releasably joined to a releasable section integral with or connected to the seal protector. Such a closing adhesive exhibits a suitable level of bonding strength to apply to the wrapping material and secure its ends around a module of harvested cotton or other material or object.

In some embodiments, the closing adhesive and releasable section are mated between a portion of the seal carrier, which is not permanently bonded to the first wrapping segment or any other portion of substrate until the wrap is finally completed, and a portion of the seal protector that is not bonded to the second wrapping segment or any other portion of substrate. By way of a non-limiting example, the releasable section may be a release liner 18 as shown in various figures herein, which disengages from a closing adhesive 22. Alternatively, the releasable section may be a coating upon a surface of the seal protector that causes the seal protector to disengage from the closing adhesive when sufficient force is exerted to separate the first and second wrapping segments. In an exemplary embodiment, such a coating is formed from Teflon™ (polytetrafluoroethylene or PTFE).

Figure 1:
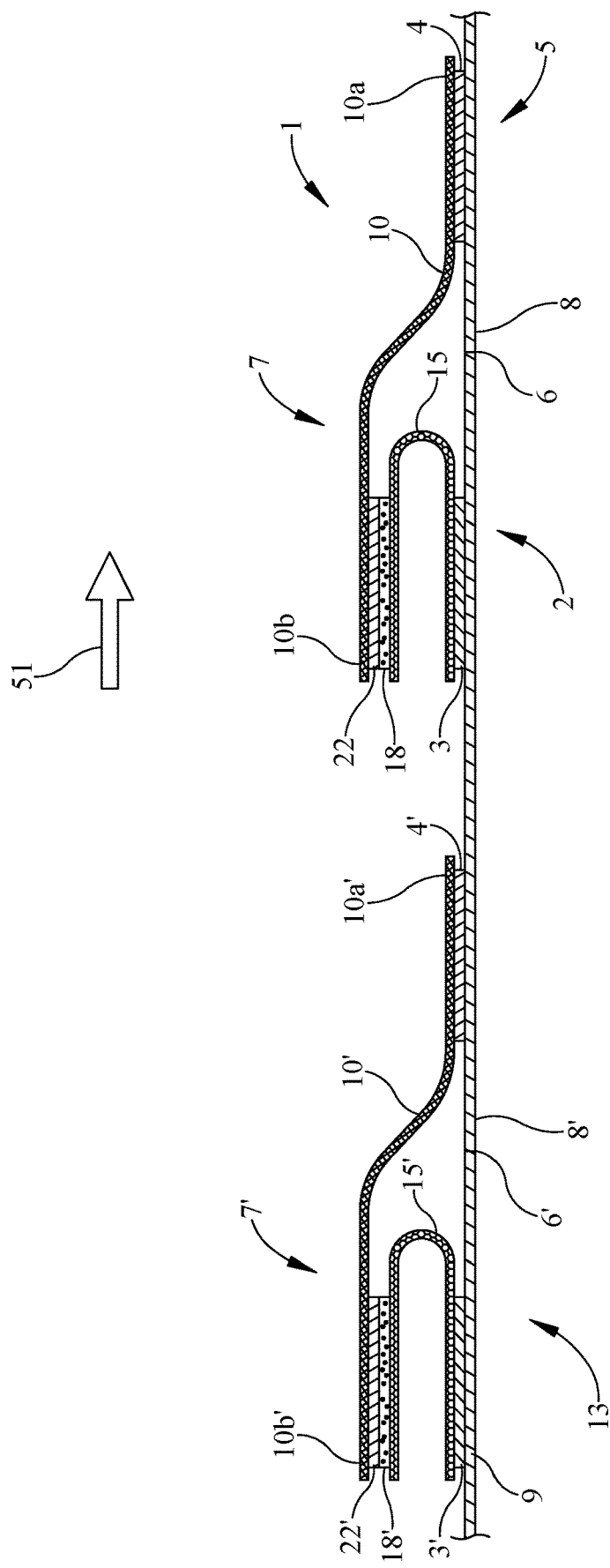

With reference now to the Figures, various embodiments and alternatives of a wrapping material comprising a plurality of wrapping segments are illustrated. FIG. 1 shows an exemplary embodiment of a wrapping material in accordance with present embodiments. For ease of reference, only the wrapping material (with sealing accessory) is illustrated, while the environment in which it is used (e.g., the bale, and components of the harvesting machine) are not illustrated.

According to an embodiment of a wrapping material 5, as illustrated in FIG. 1, first wrapping segment 1 is part of a continuous substrate 9, of which second wrapping segment 2 also is a part. As shown, these segments are separated by perforations 6 or other modification of the film serving as a line of demarcation between adjacent wrapping segments. In the description of multiple embodiments and alternatives, a separable connection between adjacent wrapping segments is referred to as perforations 6, although it could be any of a number of separable connections identified herein or otherwise as known in the art. Also, the adjacent wrapping segments are referred to as first wrapping segment 1 and second wrapping segment 2, again for ease of reference.

Figure 2:
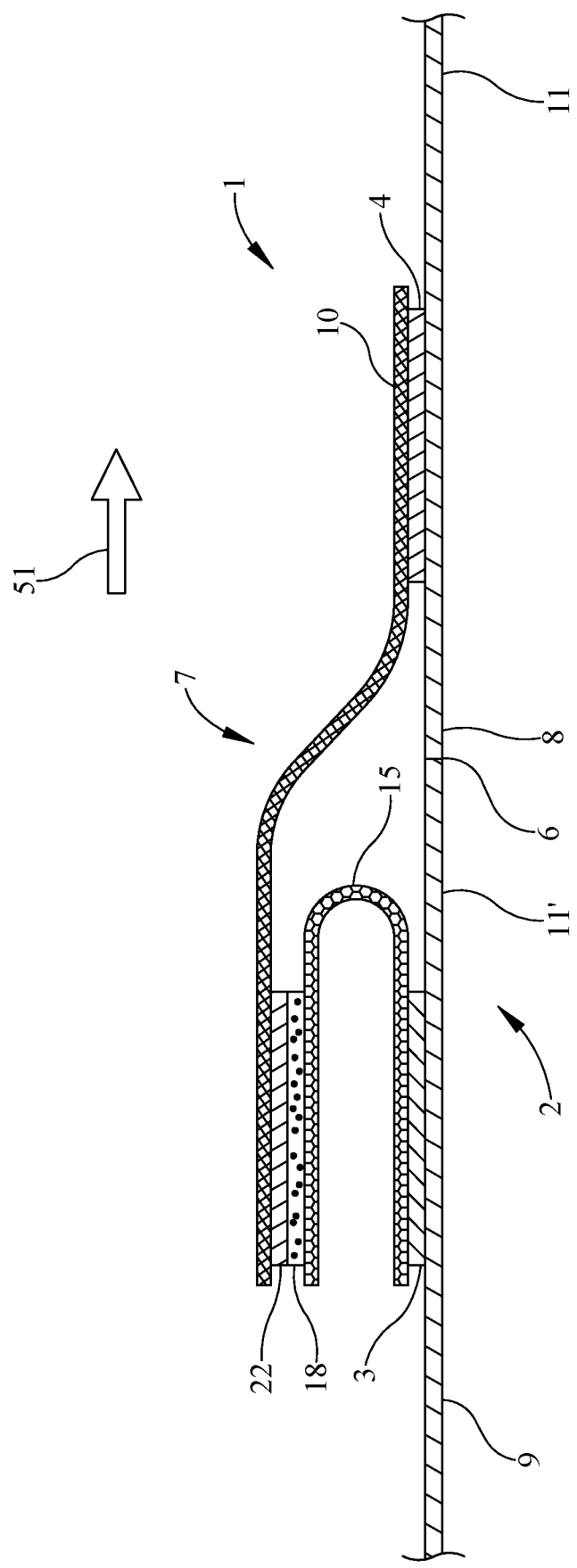
FIG. 2 is a side perspective view of a wrapping material during operation, arranged to wrap objects, according to multiple embodiments and alternatives.
Figure 6:
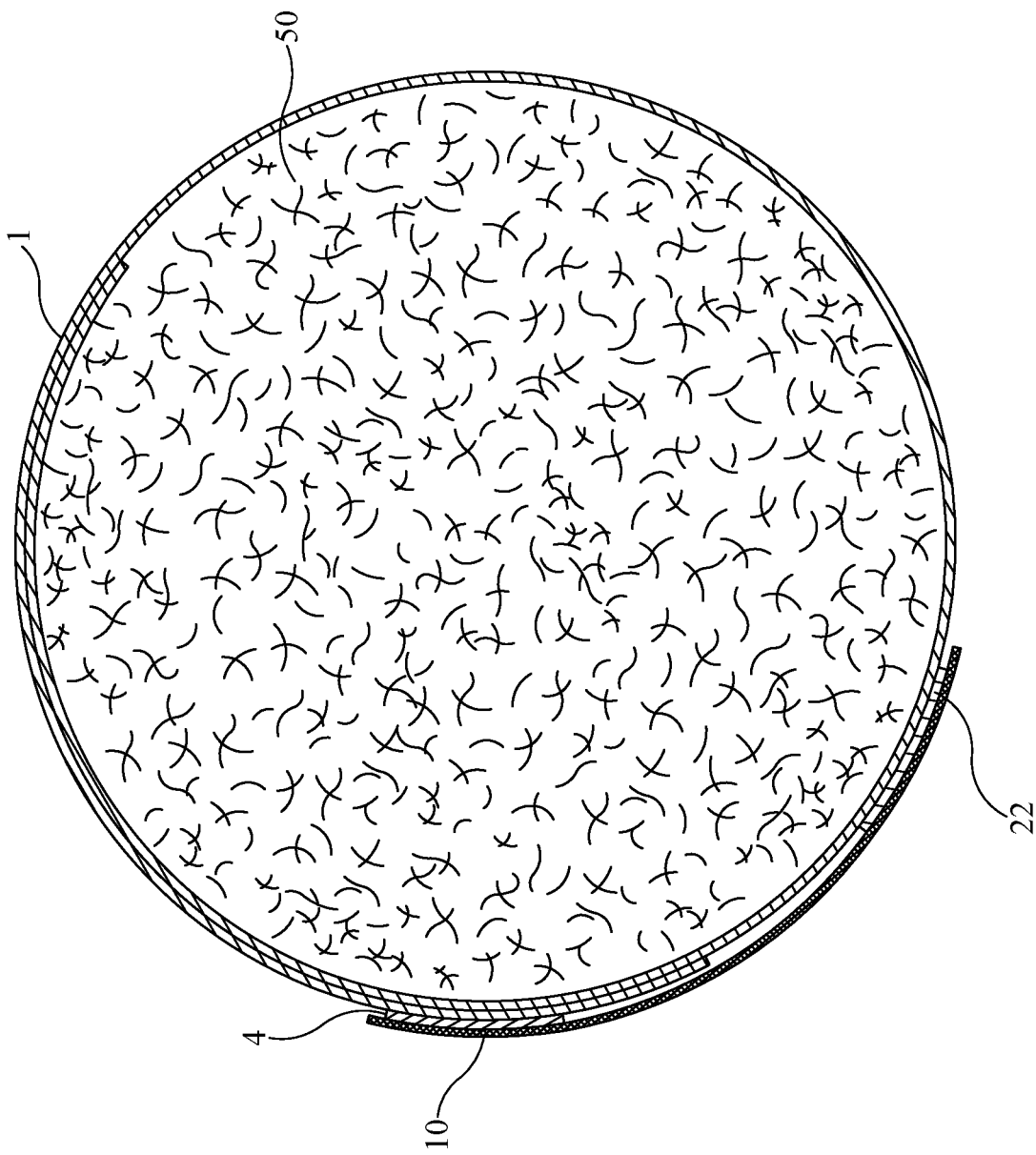
FIG. 6 provides a side perspective view of a wrapped module of harvested material, according to multiple embodiments and alternatives.

In use, as FIG. 1 indicates, the wrapping material 5 generally is moving in a direction shown as arrow 51, for the purpose of wrapping the first wrapping segment 1 circumferentially around an object 50 (shown in other figures). When this wrap is completed, a closing adhesive 22 will seal a trailing end 8 of first wrapping segment 1 to a portion of that same wrapping segment 1 generally referred to as its leading end 11 (see FIG. 2). Thus, upon completing a wrapping cycle, a surface of wrapping segment 1 is positioned beneath, and contacted directly by, closing adhesive 22 as shown in FIG. 6. In this manner, the sealing of the wrapping segment is automatic by the rotation of the wrapping segment around the bale in the harvesting machine, as is the separation of adjacent wrapping segments in the substrate 9. FIG. 6 also underscores that various parts of a sealing accessory remain with one wrapping segment, while other parts of the same sealing accessory remain with an adjacent wrapping segment. To illustrate, FIG. 6 is a view of a completed wrap wherein wrapping segment 1 has encircled the width of object 50 one or more times, and then adhered to itself by contact with closing adhesive 22. Also shown in this figure are seal carrier 10 and permanent adhesive 4, which secures the seal carrier to wrapping segment 1. But other components of seal accessory 7, for example release liner 18 and seal protector 15 as shown in FIGS. 1 and 2, are not in FIG. 6. This is because during separation they will have remained joined directly or indirectly to wrapping segment 2.

It will be appreciated, therefore, that a wrapping segment (such as 1) is secured to itself during wrapping of an object, with the aid of a sealing accessory that includes, at least, a seal carrier 10, a seal protector 15, a releasable section which can be a release liner 18, and a closing adhesive 22 that completes the seal at the end of a wrapping cycle. In some embodiments, a sealing accessory 7 including seal carrier 10 and various other components are arranged to complete this seal of the wrapping segment; however, only the seal carrier 10 spans adjacent wrapping segments. The seal carrier 10 does not hold the continuous substrate 9 together at any point, either during manufacturing, or during unwinding. The fact that structures like sealing accessory 7, seal carrier 10, and seal protector 15 do not hold the continuous substrate 9 together, but rather wrapping segments are connected at separable points already weakened by breaking, makes it easier to separate one wrapping segment from the next. This helps reduce certain problems with prior wrapping materials, including unreliable and inconsistent release of wrapping segments from each other.

With still further reference to FIG. 1, a first end 10a of seal carrier 10 is bonded to first wrapping segment 1, so this portion is attached directly to the substrate. In some embodiments, this bonding is with a permanent adhesive 4. However, other technologies as known in the art that do not require an adhesive can be employed as well, such as heat bonding and sonic welding. Likewise, seal protector 15 is bonded to second wrapping segment 2. Again, in some embodiments, this bonding is with a permanent adhesive 3, but other technologies as known in the art such as heat bonding and sonic welding can be employed. When bonded in a chosen manner, preferably the portion of seal carrier 10 bonded to first segment 1 and the first segment 1 do not separate, nor is the separation of the portion of seal protector 15 bonded to second wrapping segment 2. Optionally, seal protector 15 is doubled over on itself, in which case only the portion of seal protector 15 in contact with second wrapping segment 2 is bonded to second wrapping segment 2. In some embodiments, a portion of seal protector 15 not in contact with second wrapping portion 2 has a release liner 18 attached to one of its surfaces. In some embodiments, release liner 18 is formed of natural or synthetic constituents (or blends thereof) and may be heat bonded, welded (such as sonically welded), glued, or otherwise have a first surface connected to seal protector 15 in accordance with techniques known in the pertinent art. Another surface of release liner 18 (i.e., not the aforementioned first surface) is temporarily adhered with closing adhesive 22 to a second end 10b of seal carrier 10, and this particular portion extends beyond the division between adjacent wrapping segments (e.g., perforations 6) into a space above second wrapping segment 2 as defined in a dimension that can be thought of as vertical. Because the second end 10b of seal carrier 10 is separated from substrate 9 by seal protector 15, this end of the seal carrier is considered to be attached indirectly to the substrate. In an exemplary embodiment, when a seal carrier 10 is attached or adhered at a first end, this is closer to a longitudinal end of the seal carrier than to the longitudinal midpoint of such seal carrier. Likewise, when a seal carrier 10 is attached or adhered at a second end, this is closer to the opposite longitudinal end of the same seal carrier than to its longitudinal midpoint. Optionally, such points of attachment or adherence could extend to within a 1-2 inches of each longitudinal end, or even make contact with either longitudinal end, but other than being closer to a longitudinal end than the midpoint of the seal carrier 10, their exact location is not a limiting feature.

The bond created between release liner 18 and seal protector 15 should be of greater strength than the adherence between release liner 18 and closing adhesive 22. The differences are such that when force is applied sufficient to separate wrapping segment 1 from wrapping segment 2, it also causes closing adhesive 22 to separate from release liner 18, while closing adhesive 22 remains permanently attached to the aforementioned second end of seal carrier 10, and release liner remains attached to seal protector 15 as seen, for example, in FIG. 12.

In this way, during a wrapping cycle, closing adhesive 22 is protected from having its sticky material exposed to the machine components until the point at which the wrapping segments separate. The seal carrier 10 then continues its path under a momentum created as wrapping segment 1 encircles the module. As this occurs, seal carrier 10, with the closing adhesive 22 now exposed for the end of a wrapping cycle, causes wrapping segment 1 to attach to itself. At that point, object 50, such as a harvested bale of cotton or other fibrous material, is wrapped relatively securely and protected against natural elements.

FIG. 1 represents that on a single roll of wrapping material, formed on a continuous substrate 9, there will be a plurality of sealing accessories 7. In this sense, sealing accessory 7' is labeled in FIG. 1. Like components are provided with like reference numerals, only the seal carrier for sealing accessory 7' is labeled 10'. Other structures associated with seal carrier 7'—permanent adhesive 4', closing adhesive 22', release liner 18', carrier protector 15', and permanent adhesive 3'—are labeled in like manner with prime numbers to indicate this is a different seal carrier upon a different pair of wrapping segments than described for seal carrier 7. Similarly, a trailing end 8' of wrapping segment 2 is labeled. Accordingly, it will be noted that sealing accessory 7 spans two adjacent wrapping segments, namely wrapping segment 1 and wrapping segment 2. Likewise, sealing accessory 7' spans two adjacent wrapping segments, but these are wrapping segment 2 and wrapping segment 13.

In some embodiments, seal carrier 10 is attached directly and non-releasably to only two adhesives, namely permanent adhesive 4 and closing adhesive 22. Likewise, in some embodiments, any individual wrapping segment, such as wrapping segment 2, is attached directly and non-releasably to only two adhesives, namely permanent adhesive 4' and permanent adhesive 3' as illustrated in FIG. 1.

FIG. 2 illustrates wrapping segment 1 and wrapping segment 2, moving in a direction depicted by arrow 51. Sealing accessory 7 spans the two wrapping segments, generally from a point nearer the trailing end 8 of wrapping segment 1 to a point nearer leading end 11' of wrapping segment 2.

Figure 3:
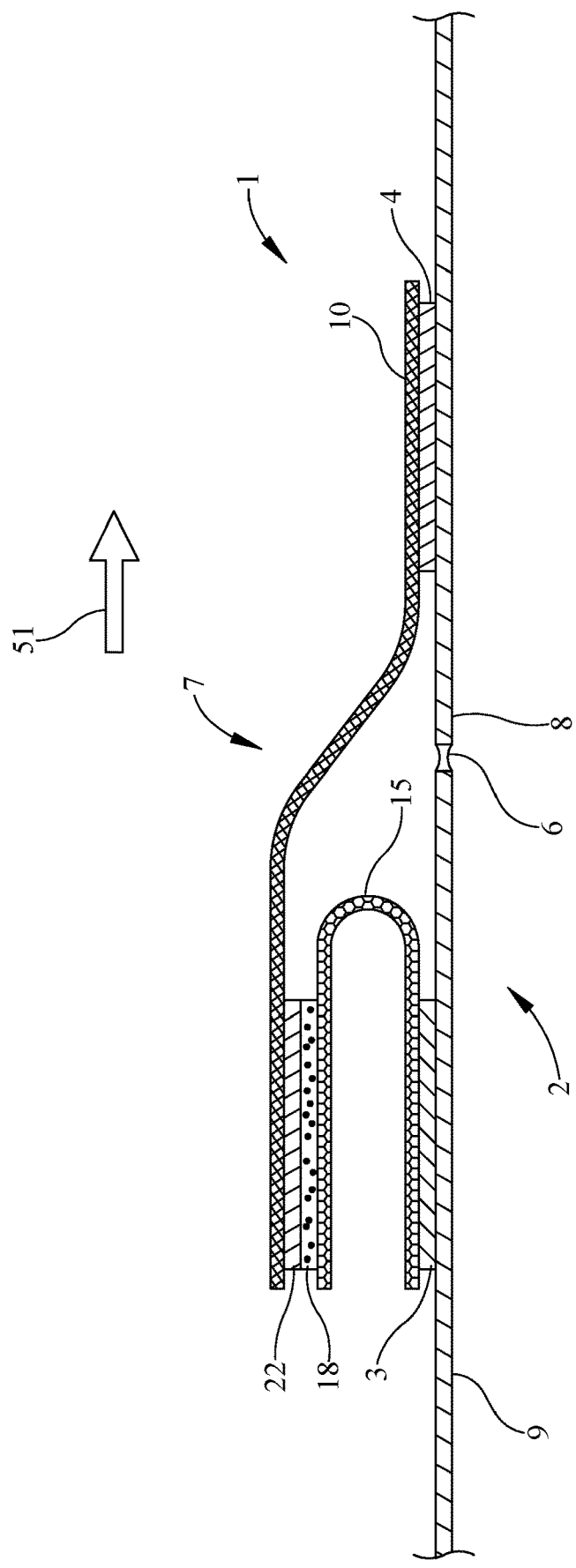
FIG. 3 is a side perspective view of a wrapping material during operation, arranged to wrap objects, according to multiple embodiments and alternatives.

FIG. 3 provides a view of the wrapping material that represents the perforations 6 between wrapping segment 1 and wrapping segment 2 beginning to break down as part of separating those two wrapping segments during a wrapping cycle. One way of achieving the needed separation is to create a speed differential between wrapping segment 1 and the remainder of the continuous roll that includes wrapping segment 2. As wrapping segment 1 is getting ready to come off due to the unwinding of the roll, the wrapping segments are generally traveling in direction 51 which can be thought of as toward the harvesting machine (not shown). The object is to create a stress at the separable connection (e.g., perforations 6) that divides these two wrapping segments. In this way, the perforations 6 allow the amount of stress, or, force, needed to accomplish the separation to be less than it otherwise would be if there were no such separable connection between adjacent wrapping segments. Accordingly, a system that will slow or stop the travel of wrapping segment 2, relative to the speed of travel for wrapping segment 1, can be used to apply the needed force. Such can be a brake or a clutch that controls the speed of unwinding as known in the art. An example of how this is accomplished includes a brake-clutch mechanism as described in the aforementioned U.S. Published Patent Application 20160280404.

Figure 4:
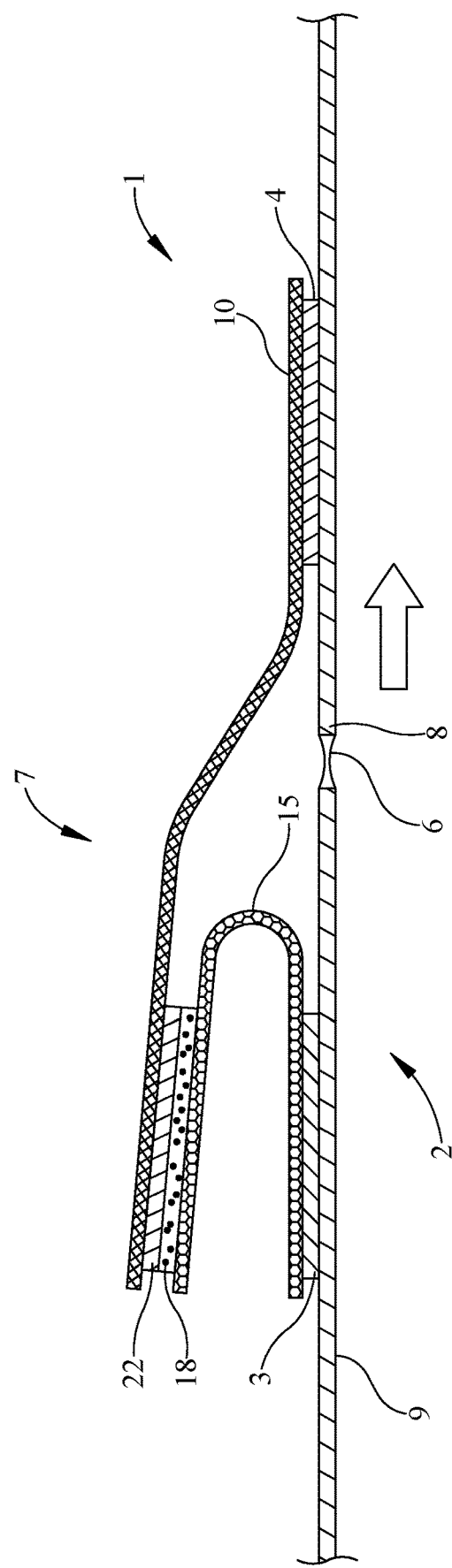
FIG. 4 is a side perspective view of a wrapping material during operation, arranged to wrap objects, according to multiple embodiments and alternatives.

Accordingly, FIG. 3 represents a narrowing effacement of the separable connections which in some cases is marked by an elongation of the wrapping material immediately proximal to perforations 6. FIG. 4 represents this same phenomena, and at the same time in FIG. 4, a portion of sealing accessory 7 located closer to wrapping segment 2 (the segment moving slower in response to brake or clutch action) is beginning to tilt in the direction the wrapping material is traveling, toward the machine, in preparation for separating the closing adhesive 22 from the release liner 18 seen in subsequent figures. In both FIG. 3 and FIG. 4, closing adhesive 22 and release liner 18 are joined directly or indirectly to seal protector 15, the latter of which is adhered to wrapping segment 2 by permanent adhesive 3. During the manufacture of the roll, it is beneficial in some circumstances to arrange seal protector 15 so it at least partially folds over upon itself, with the folded-over portion oriented toward the roll as illustrated. Depending on size and scale of the wrapping material being used, this can facilitate a more natural movement of seal protector 15 during unwinding and separation which enables closing adhesive 22 to be exposed at a desirable point in the process.

Figure 5:
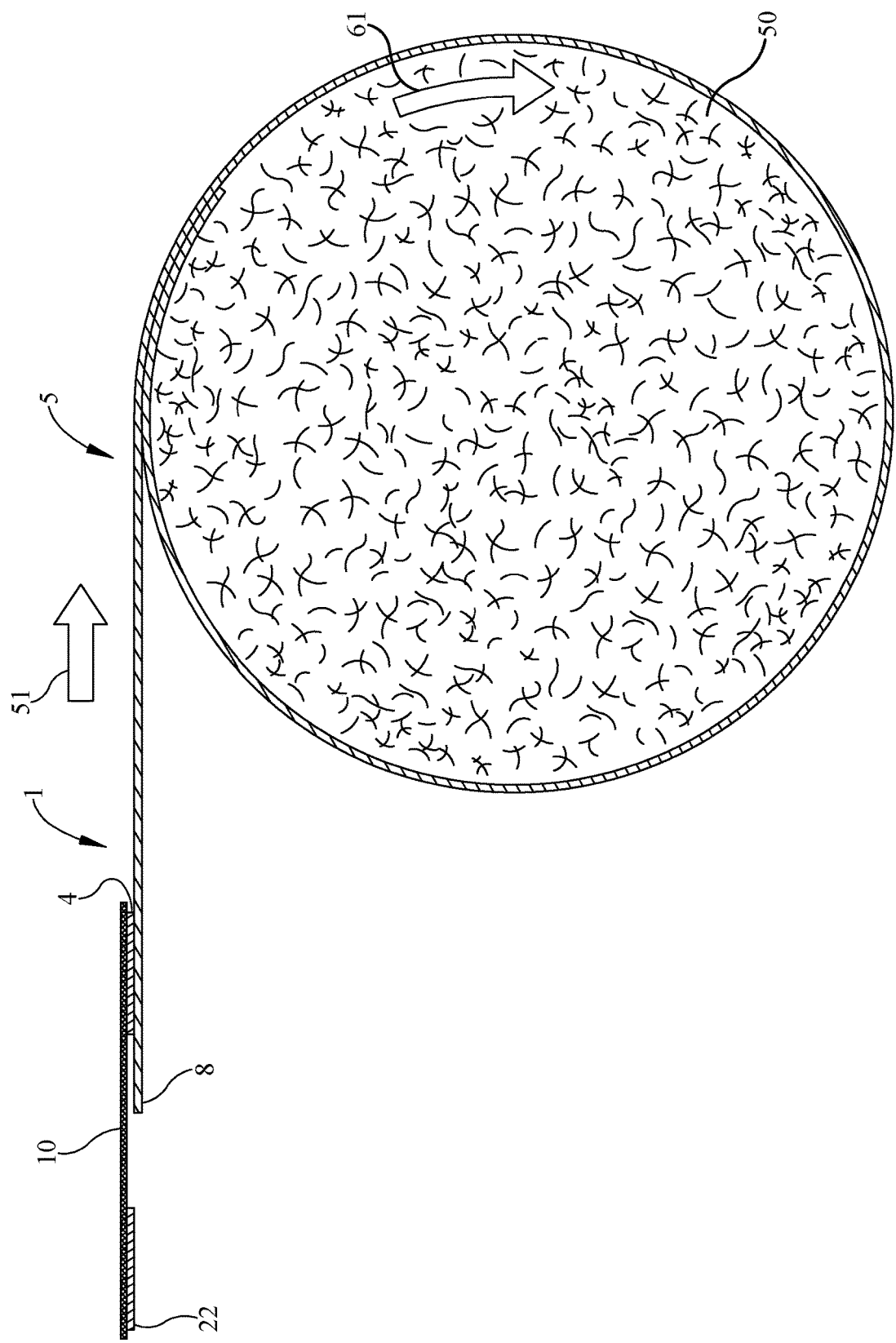
FIG. 5 provides a side perspective view of a wrapping material in the process of encircling a module of harvested material, according to multiple embodiments and alternatives.

FIG. 5 helps illustrate wrapping segment 1 after it has separated from wrapping segment 2, with the wrapping segment moving in a direction noted by arrow 51 relative to the object being wrapped. As shown, wrapping segment 1 has begun the process of wrapping around object 50, as the latter rotates in a direction indicated by arrow 61. Components (not shown) in the harvesting machine produce the rotation of object 50, urging the wrapping segment in like manner to cover the object. The direction of rotation of object 50 and, therefore, of wrapping segment 1 as it encircles said object (i.e., clockwise or counterclockwise when viewed from the same perspective as FIG. 5) generally is determined by the machine manufacturer. It will be appreciated that at wrapping segment 1 is the only one of the wrapping segments having made up wrapping material 5 that is being used to circle this particular object 50. It also will be readily observed that closing adhesive 22 is now exposed, having been separated from release liner 18 to which it was attached in prior figures. In this way, closing adhesive 22 is positioned to seal the wrap after wrapping segment 1 has continued through another revolution or part of a revolution around object 50. At this point, closing adhesive 22 remains attached to seal carrier 10, itself attached by permanent adhesive 4 at a different point to wrapping segment 1, near a trailing end 8 of that wrapping segment.

Figure 12:
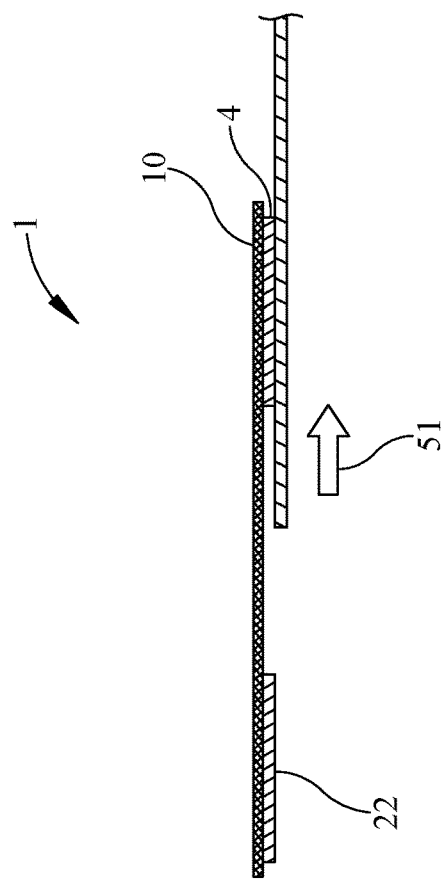
FIG. 12 is a side perspective view of separated wrapping segments, according to multiple embodiments and alternatives.
Figure 12:
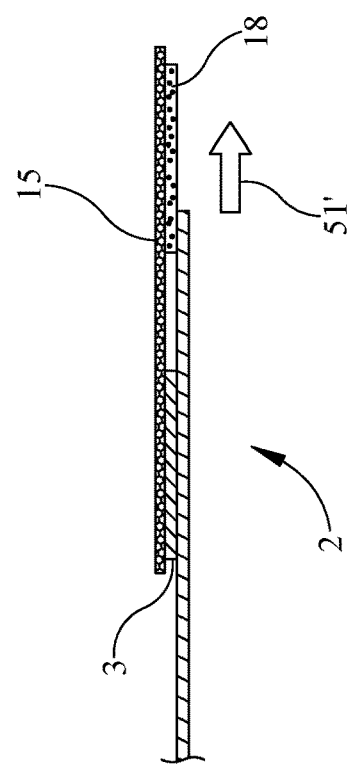

FIG. 12, as further context for FIG. 5, illustrates wrapping segment 1 and wrapping segment 2 after they have separated. Arrow 51 represents a speed of travel for wrapping segment 1, while arrow 51' represents a speed of travel for another portion of the substrate that includes wrapping segment 2, and is at a lesser velocity (or is stopped momentarily) relative to the speed of travel for wrapping segment 1. The result of separation is that seal protector 15 and release liner 18 remain with wrapping segment 2, with seal protector 15 no longer having to be in the folded-over configuration and otherwise remaining adhered to that wrapping segment by permanent adhesive 3, as shown. Conversely, seal carrier 10 and closing adhesive 22 remain with wrapping segment 1 at this point.

Figure 7:
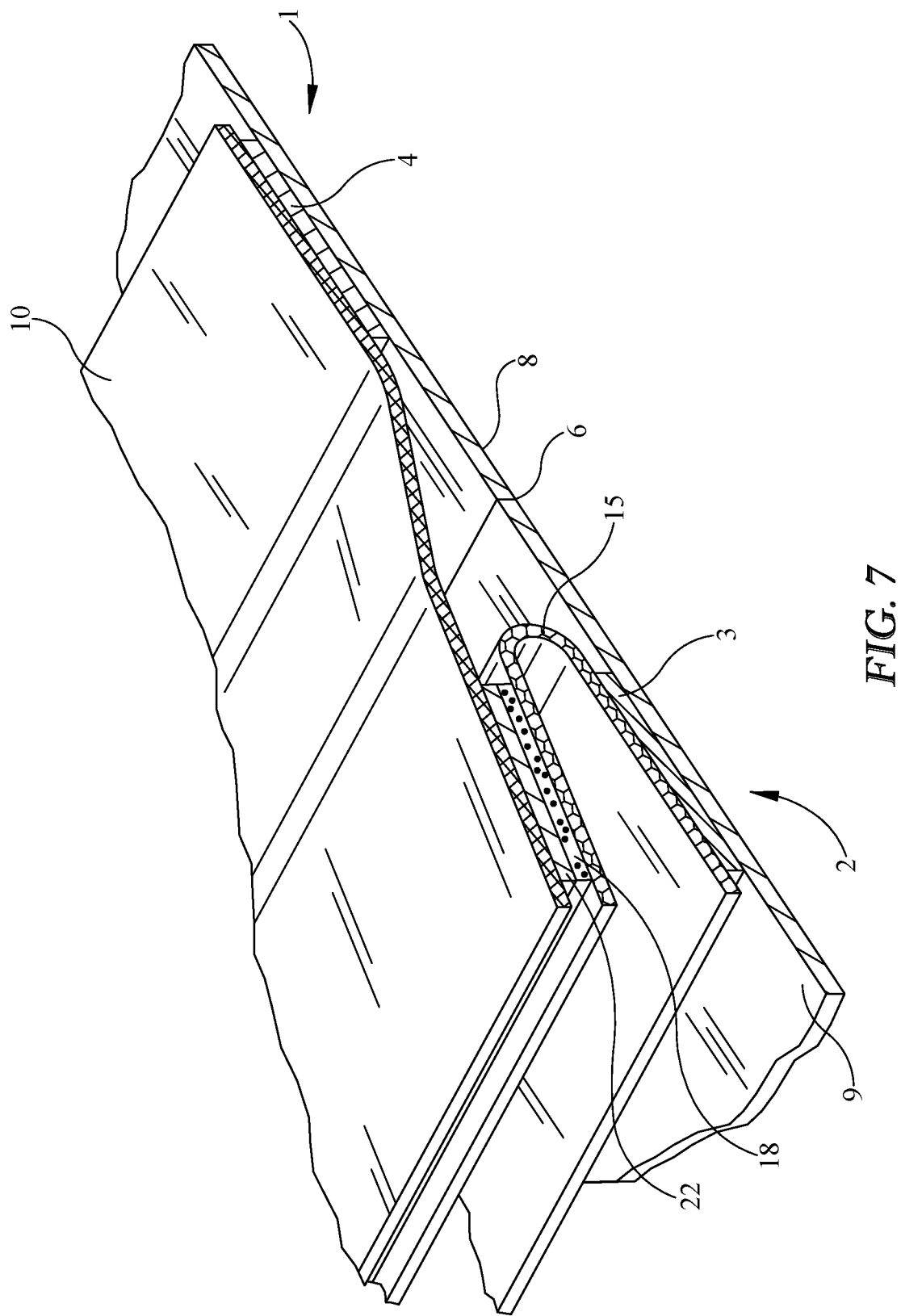
FIG. 7 is an elevated side view of a wrapping material during operation, arranged to wrap objects, according to multiple embodiments and alternatives.

FIG. 7 provides a view of wrapping segment 1 and wrapping segment 2, with seal carrier 10 spanning those two wrapping segments. Upon wrapping segment 1, a permanent adhesive 4 secures a first end of seal carrier 10 to a surface of substrate 9, which is considered a first surface of the substrate, whereas a surface opposite the first surface (and having no adhesive when the roll is formed) is a second surface of substrate 9. In turn, upon wrapping segment 2, a permanent adhesive 3 indirectly and releasably attaches a second end of seal carrier 10 to the substrate 9. Again, wrapping segment 1 and wrapping segment 2 are in effect separably connected to each other at perforations 6. Intermediate structures in FIG. 7 located between permanent adhesive 3 and seal carrier 10 include seal protector 15, in its more folded over configuration, release liner 18, and closing adhesive 22.

Figure 8:
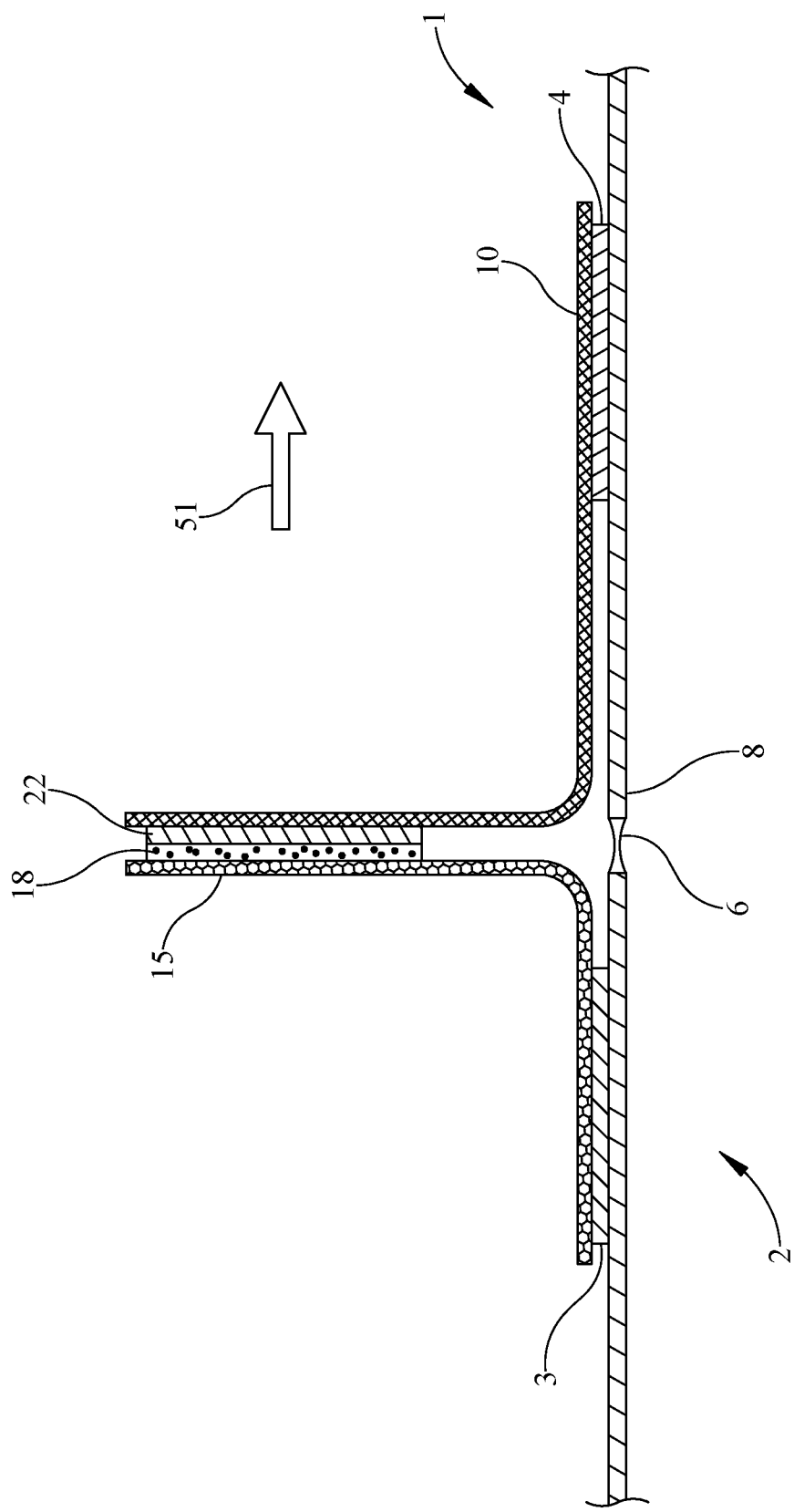
FIG. 8 is a side perspective view of a wrapping material during operation, arranged to wrap objects, according to multiple embodiments and alternatives.

With a direction of travel still indicated by arrow 51, FIG. 8 affords a side perspective view suggestive of a preliminary stage prior to full separation of the closing adhesive 22 and release liner 18. Of note here is the manner in which the aforementioned speed differential will have slowed wrapping segment 2 relative to wrapping segment 1. The effect, as illustrated, is that seal protector 15 begins to be less folded upon itself. Continuing this progression towards separation, FIG. 9 points to a region of release liner 18a, this region being more proximal to substrate 9, which is starting to be pulled away from closing adhesive 22.

Figure 9:
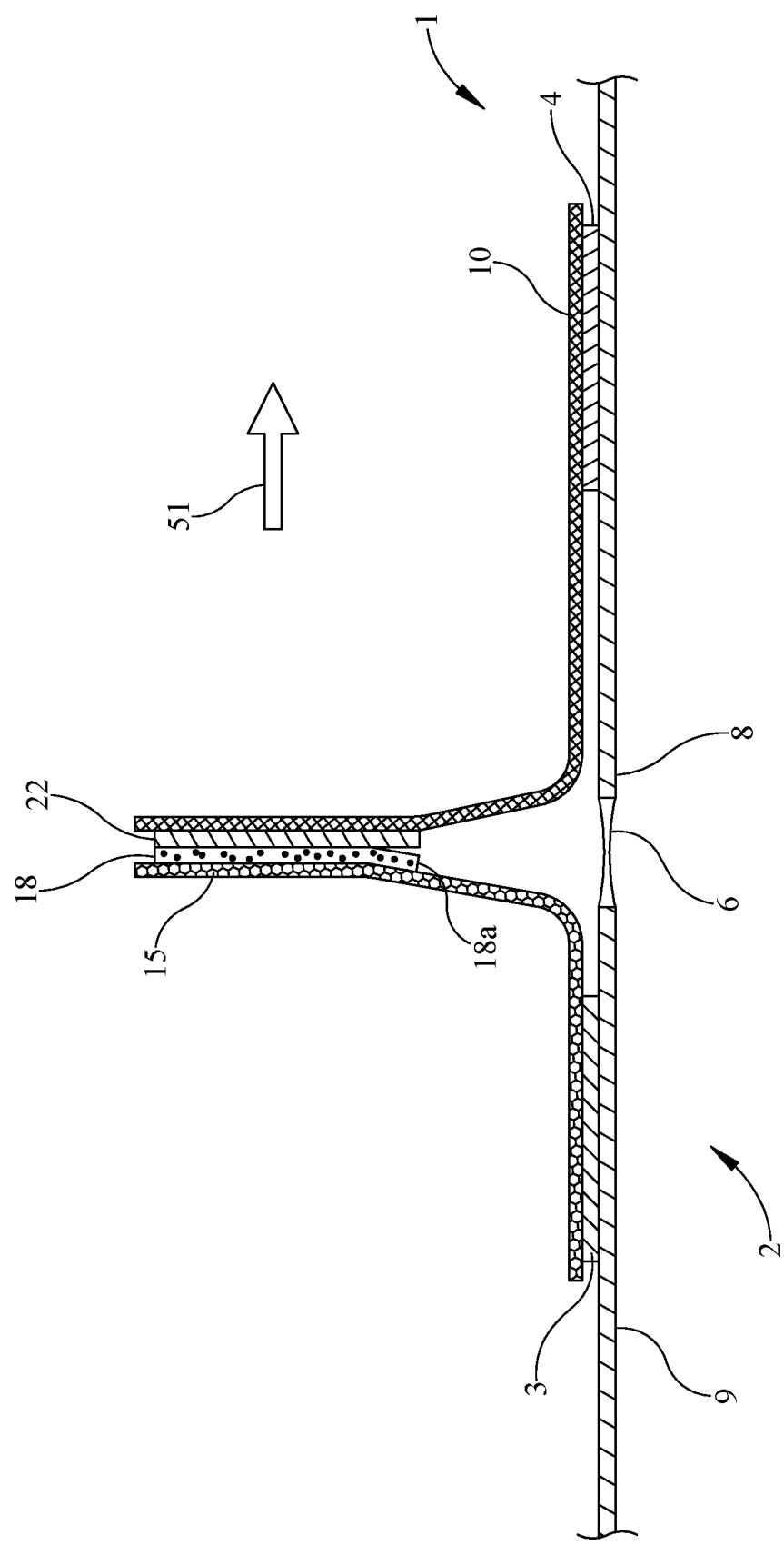
FIG. 9 is a side perspective view of a wrapping material during operation, arranged to wrap objects, according to multiple embodiments and alternatives.

In some embodiments, the perforations 6 that demarcate wrapping segments 1 and 2 are approximately centered near the span between seal protector 15 and seal carrier 10 when the separation is in its preliminary stages, for example in FIGS. 8 and 9. However, it will be appreciated that distances of perforations 6 in relation to seal accessory 7 upon adjacent wrapping segments is a matter of design choice prompted by the characteristics of the particular wrapping operation, the material of wrapping segments, and the type of wrapping machine used.

Figure 10:
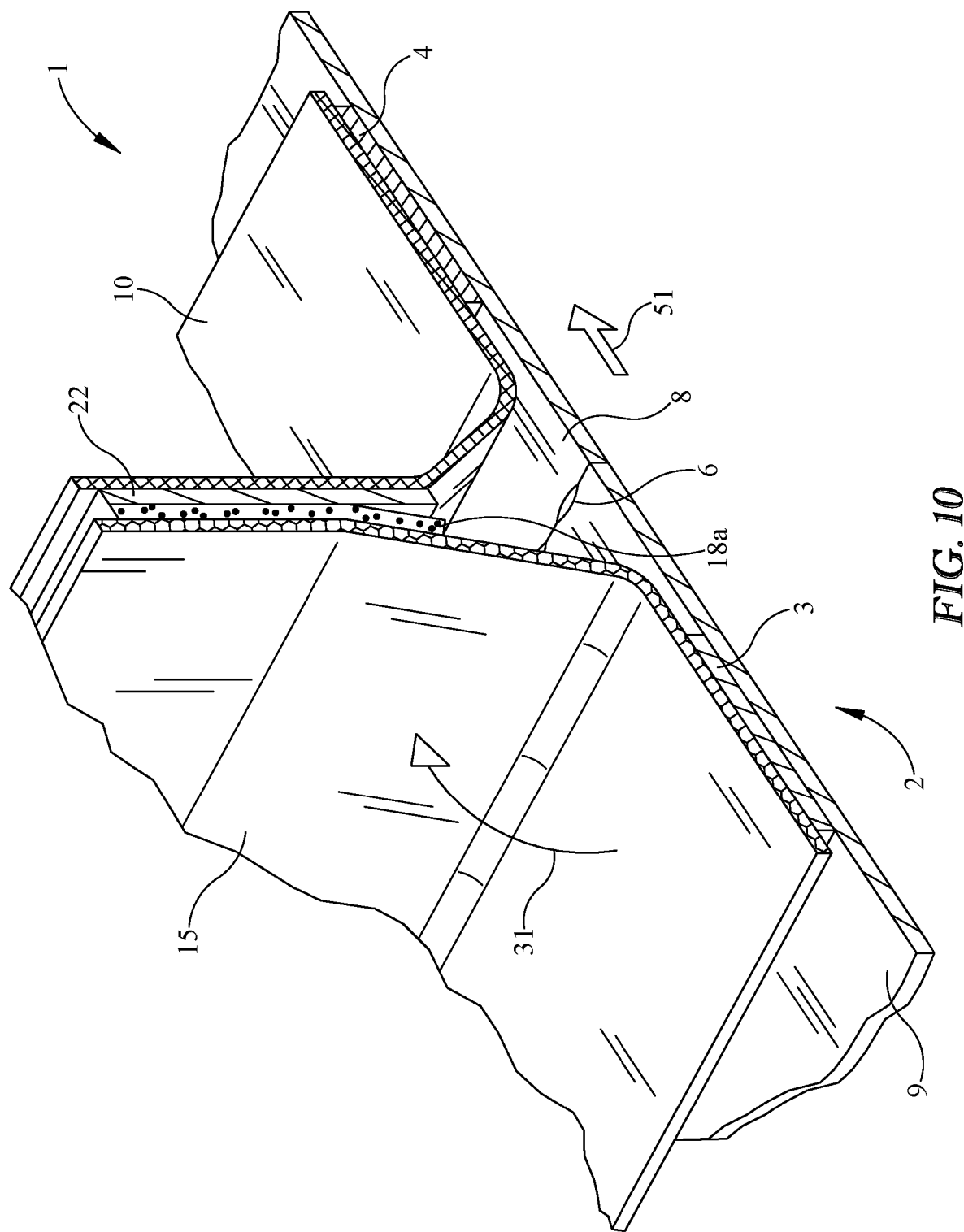
FIG. 10 is an elevated side view of a wrapping material during operation, arranged to wrap objects, according to multiple embodiments and alternatives.
Figure 11:
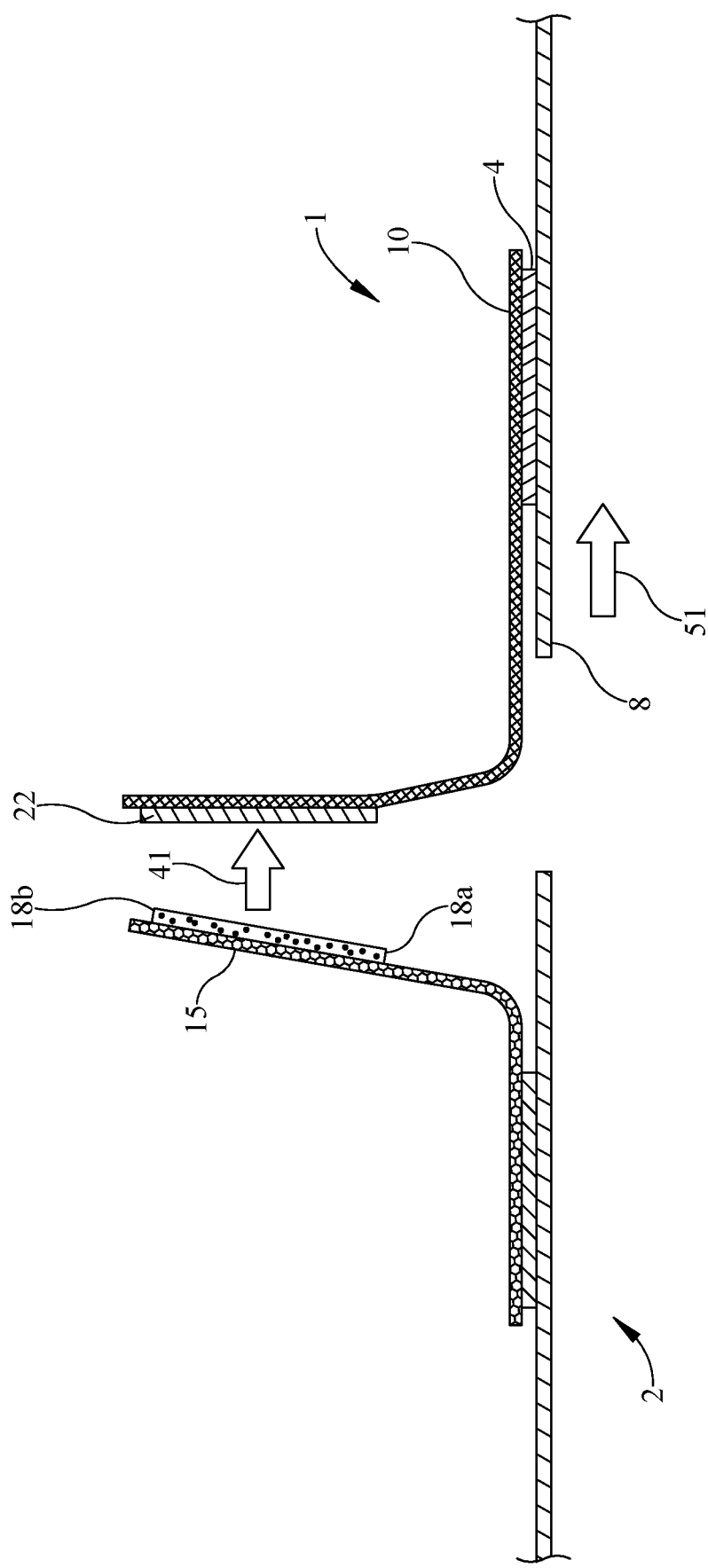
FIG. 11 is a side perspective view of a wrapping material during operation, arranged to wrap objects, according to multiple embodiments and alternatives.

In like manner, FIG. 10 provides a similar view as FIG. 9 but as though from a somewhat side elevated perspective, giving a different vantage point on the seal carrier 10, seal protector 15, release liner 18, and closing adhesive 22. In particular, region 18a of the release liner, being more proximal to the substrate, is labeled, to indicate an area where closing adhesive 22 and release liner 18 are beginning to separate. Here again, the aforementioned speed differential urges the seal protector 15 to be less folded over. Specifically, part of seal protector 15 not being connected to the substrate by permanent adhesive 4, is moving in a semi-rotational fashion in a direction indicated by arrow 31. Progressing, full separation of wrapping segment 1 from wrapping segment 2 is shown in FIG. 11. This figure shows closing adhesive 22 moving away from release liner 18 in a direction generally indicated by arrow 41. Shown here is a full separation between closing adhesive 22 and the entire length of the release liner 18 from ends 18a to 18b.

Now turning to manufacture of the roll, with wrapping segments, FIG. 13 illustrates wrapping material 5 being wound about a core 62 to form a supply roll. Arrow 49 indicates one possible direction of linear motion of the wrapping material 5 toward core 62 during manufacture. Likewise, arrow 48 indicates a direction of rotation as the wrapping segments as described herein are formed and placed onto a roll by being wound about its core 62. However, it will be noted that direction 48 is a matter of preference. In FIG. 13, the winding direction is generally depicted as 49, which would mean the machine direction (unwinding) would be arrow 51 as shown in other figures. As for rotational direction 48, it also may be clockwise or counterclockwise when viewed from the same perspective as FIG. 13 provides, in that wrapping material 5 can approach from above the forming roll (as shown) during manufacture, or from below the forming roll as chosen by a manufacturer of such wrapping materials.

In the manufacture of a roll according to multiple embodiments and alternatives, various approaches can be used for attaching each seal accessory 7 along the length of the substrate. In non-limiting fashion, one such approach comprises preassembly wherein the seal accessory 7 is built separately, then joined to the substrate using permanent adhesives as described herein. Another exemplary approach is to construct the seal accessory 7 that spans each pair of adjacent wrapping segments contemporaneous with forming the web, including the separable connections provided to demarcate adjacent wrapping segments. Various alternatives also exist that would incorporate certain aspects of these approaches. For example, a seal carrier 10 can be formed integral with closing adhesive 22, the latter being covered by a release liner 18 in preparation for attaching the seal protector 15 to substrate 9 and then adhering the release liner atop the seal protector as illustrated in various drawing figures. While exemplary approaches are described for illustrative purposes, a method of forming a roll of wrapping material containing a plurality of the inventive wrapping segments and seal accessories is not limited to the descriptions set forth in this paragraph. Likewise, a wide variety of adhesive configurations is contemplated, well beyond the described embodiments, which are provided as illustrative.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A wrapping material, comprising:
   a substrate having a first surface and a second surface, wherein the substrate is divided into a plurality of wrapping segments by breaks formed in the substrate;
   a plurality of seal carriers, each having a first end and a second end;
   a plurality of seal protectors, wherein each seal protector is attached to only one of the wrapping segments;
   wherein each seal carrier is attached directly and non-releasably to a first adhesive and a second adhesive, and no adhesive contacts the breaks formed in the substrate; and
   wherein an individual wrapping segment is attached directly and non-releasably to the first adhesive and to a third adhesive.

2. The wrapping material of claim 1, in which the plurality of wrapping segments are arranged on a wound roll.

3. The wrapping material of claim 2, wherein when the plurality of wrapping segments are arranged on the wound roll, each seal carrier is attached upon only the first surface of the substrate.

4. The wrapping material of claim 3, wherein the second adhesive is a closing adhesive positioned on the second end of the seal carrier, and the individual wrapping segment separates from an adjacent wrapping segment as the roll unwinds to encircle an object, such that the closing adhesive attaches directly to the second surface of the substrate of the individual wrapping segment.

5. The wrapping material of claim 1, wherein the first end of each seal carrier is attached directly to the substrate.

6. The wrapping material of claim 1, wherein the second end of the seal carrier is attached indirectly to the substrate.

7. The wrapping material of claim 1, further comprising a releasable section between each seal protector and the seal carrier.

8. The wrapping material of claim 7, wherein the releasable section is a release liner.

9. The wrapping material of claim 1, wherein no more than two adhesives are attached directly and non-releasably to the seal carrier, and no more than two adhesives are attached directly and non-releasably to the individual wrapping segment.

10. A wrapping material, comprising:
    a substrate having a first surface and a second surface, wherein the substrate is divided into individual wrapping segments by breaks formed in the substrate;
    a plurality of seal carriers having a first end and a second end, with each seal carrier being attached at one of the ends to adjacent wrapping segments, wherein each seal carrier is attached upon only one of the surfaces of the substrate;
    a plurality of closing adhesives, each attached to a second end of one of the seal carriers; and
    a roll comprising a plurality of the wrapping segments, wherein each wrapping segment is joined to at least one other wrapping segment at a separable connection, and wherein each wrapping segment when it is on the roll comprises:
    a seal protector, and
    a releasable section between the seal protector and one of the closing adhesives.

11. The wrapping material of claim 10, wherein the first end of each of the plurality of seal carriers is attached directly to the surface of the substrate by a non-releasing adhesive.

12. The wrapping material of claim 11, wherein while located on the roll, the second end of each of the plurality of seal carriers is attached indirectly to the substrate and is separated from the surface of the substrate by the seal protector.

13. The wrapping material of claim 12, wherein the first end of each of the plurality of seal carriers is attached to a different wrapping segment than the second end of each of the plurality of seal carriers.

14. The wrapping material of claim 10, wherein no adhesive contacts the breaks formed in the substrate.

* * * * *